United States Patent [19]

Walker

[11] 4,392,328
[45] Jul. 12, 1983

[54] CELLULAR MOIST FILM PLANT CULTURE SYSTEM

[76] Inventor: Fred L. Walker, 55 San Marcos Ct., Salinas, Calif. 93901

[21] Appl. No.: 280,358

[22] Filed: Jul. 6, 1981

[51] Int. Cl.³ ............................................. A01G 31/00
[52] U.S. Cl. ...................................................... 47/62
[58] Field of Search ............................ 47/48.5, 62–65, 47/66, 67, 79, 87, 81, 59–61

[56] References Cited

U.S. PATENT DOCUMENTS

| | | | |
|---|---|---|---|
| 2,026,322 | 12/1935 | Raines | 47/62 X |
| 2,931,140 | 4/1960 | Laffler et al. | 47/48.5 |
| 3,304,653 | 2/1967 | Zadarnowski | 47/48.5 |
| 4,035,950 | 7/1977 | Anselm | 47/59 |
| 4,079,547 | 3/1978 | Walker | 47/62 |

FOREIGN PATENT DOCUMENTS 2050788  1/1981  United Kingdom ..................... 47/64

Primary Examiner—James R. Feyrer

[57] ABSTRACT

An improved system for growing plants is provided which includes an envelope having a closable seam along at least one edge and having sheets of porous flexible material which carry a number of dry nutrient packs supported within the envelope. Plants may be inserted at intervals along the open seam and the seam partly closed by clamping means around the stems of each of the plants. In one embodiment of the invention a vertical configuration is employed while in other embodiments, a horizontal configuration is employed.

8 Claims, 11 Drawing Figures

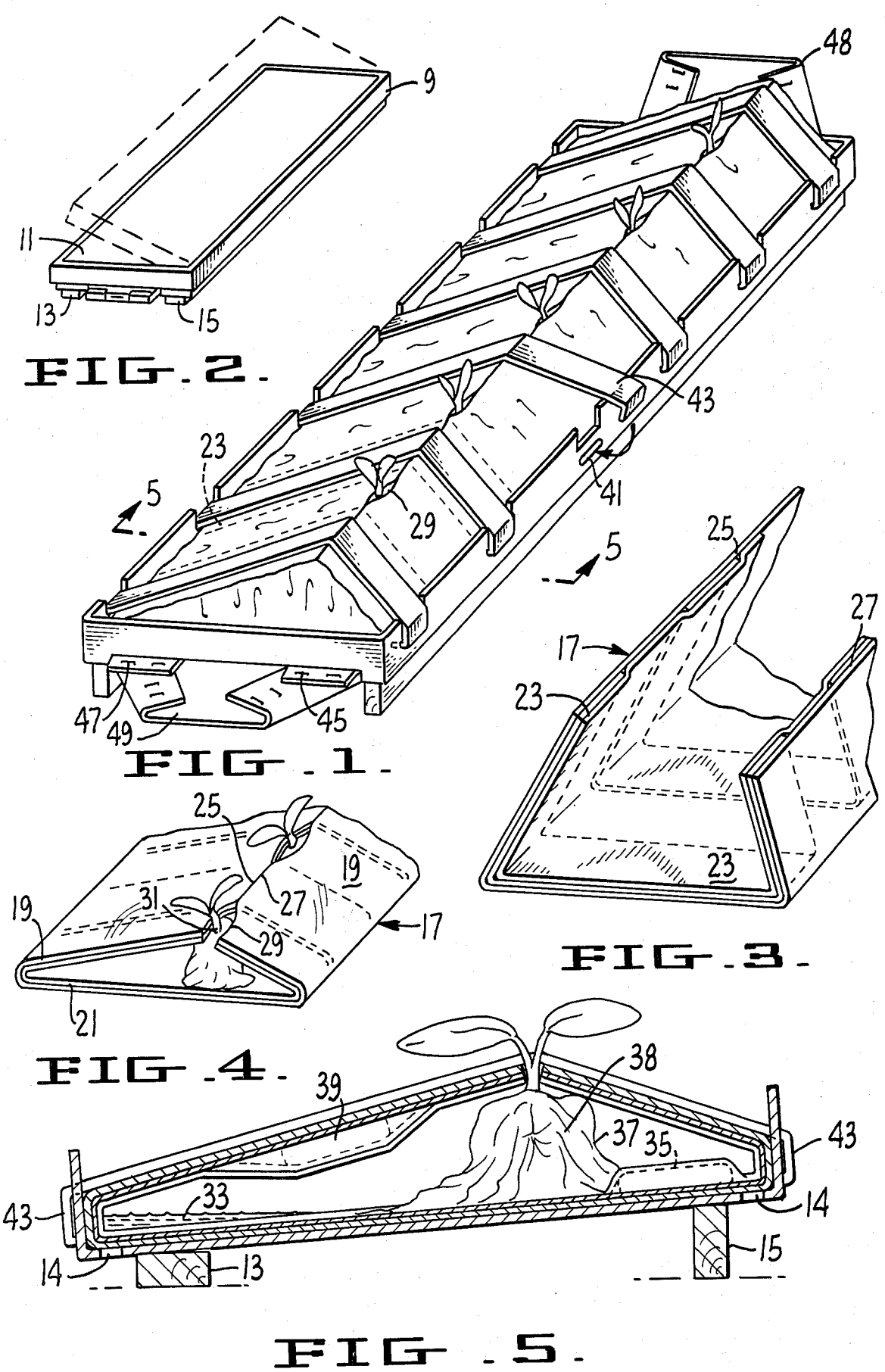

CELLULAR MOIST FILM PLANT CULTURE SYSTEM

SUMMARY OF THE INVENTION

The present invention is an improvement on the cellular moist film plant culture system of my prior U.S. Pat. No. 4,079,547. Although my prior patent represents a substantial advance in the art, the system contained therein had some deficiencies which are corrected by the system of the present invention.

One difficulty was that the plant pocket contained aggregate (planting mix) in which seedling root balls were planted. Surface evaporation at the top of the pocket caused harmful salts to crystalize there. Root, initially, had to penetrate a considerable quantity of soil-like aggregate saturated with chemical fertilizers before they could emerge onto the interior moist film surfaces where they could absorb pure water condensation from the air pockets to offset the concentrated intake of surface chemicals. The result was to delay early plant propagation, while certain sensitive plants, like strawberries, would not survive.

The present invention employs a shallow tube construction which uses a seam which closes around the base of the plant stem, preventing evaporation and salt build-up without damage to the growing plant stem. The rootball of each seedling plant sits directly on the bottom of the shallow tube so that no plant pocket or aggregate is needed and roots can immediately propagate in contact with moist surfaces and interior air pockets. Thus, early growth is healthier and faster. Also, initial planting as well as harvesting and replanting of successive crops, such as lettuce, are facilitated.

Another difficulty was that the original square envelope with the plant pocket fastened at the center could not be opened for access to the interior in order to clean out old roots, harvest root crops, and replace chemical packets. The "tent" type erection system used to expand the envelope for planting was complex, costly and difficult to operate. The envelope of the present invention has been restructured as a folding tube. This may be of flexible materials reinforced at intervals by rigid ribs, scored to bend, as later described in detail or it can be formed of a rigid plastic. In some embodiments, walls can be overlapped and folded flat for shipment, or can be opened wide to insert seedling plants and chemical packets, or can be positioned and fastened with rib ends and wall edges meeting to form a shallow tube of rigid triangular cross section. Plants such as lettuce can be readily harvested and new plants planted during the growing season. The tube can be cleaned and chemicals replaced readily. Elimination of the planting pocket and simplicity of the new structure provides for economical assembly line mass production.

The planters described in my prior patent were designed to be set on level surfaces. In urban residential situations, floor space and flat surfaces are frequently scarce, making it desirable to arrange plantings vertically to take advantage of wall space, window or door openings, or situations where planters may be hung from beams in order to produce plants and crops in a minimum of space.

According to one embodiment of the present invention a flat and flexible planting envelope is shaped long and narrow to hang vertically in any available place. Both vertical edges of the envelope are left open to form planting seams. Envelope walls are stapled at selective locations to support shelf inserts and chemical packets between the envelope walls. Seedling root balls are inserted through the open seams to rest on the shelf ends so that foliage protrudes at an angle through the seams, which are then closed around the stems of the plants with tape, clamps, etc. Any standard drip irrigation system feeds water into the top of the hanging envelope, and the shelf inserts, lined with moisture absorbent material, hold water at each level since it would otherwise gravitate to the bottom end, leaving top plants high and dry.

The cellular moist film plant culture system is a vehicle for propagating and supporting the full growth and development of plants and crops without the use of soil. Seedling plants, instead of being planted in cultivated plots of soil in conventional fields, gardens, or tubs, are set into specially designed "cells" or envelopes, which then continue to perform all the plant support functions normally provided by fertile, cultivated soil. The planted "garden" requires only watering and protection from pests during the balance of a six to nine month growing and harvesting season.

The planted envelopes (cells) enclose a complex of moisture absorbent sheets (film), dry chemical packets, stored water and pockets of moisture-saturated air. The chemicals are a homogenous mix of all required nutrient chemicals as described in detail in my prior patent.

Water, maintained by periodic irrigation, is spread throughout the cell by capillary action, keeping the moisture absorbent sheets damp. Chemicals, dissolving in the moisture of the damp sheets, spread throughout the complex by ionic migration. Plant roots, which have been inserted into the envelope, grow along, and cling to, the damp surfaces but are not themselves immersed in water. Thus, they absorb a viable combination of saturated chemical solution from the film surfaces, as well as air, and pure water condensation from the humid air pockets. It is here noted that, as used in common textbooks, water not involved in capillarity is defined as "free water", whereas "bound water" is defined as water involved in capillarity. This terminology will be used in this disclosure.

Chemicals from the damp surface moisture are absorbed as fast as the growing plants can utilize them during various stages of growth. As fast as the dissolved chemicals are removed from the saturated surface moisture, more of the dry chemicals dissolve, thus maintaining the nutrient moisture at a saturated level and supporting whatever rate of plant growth may be in progress from time to time.

The present invention has a number of advantages over hydroponic systems. Unlike hydroponic culture systems, the moist film system contains sufficient dry chemicals for an entire growing season and requires no circulating nutrient solution to be carefully controlled and maintained. It therefore requires no system of troughs, tubes or pumps to effect a substantial uniform flow of irrigation water and nutrients throughout a planted area. The moist film planters of the present invention may be installed on rough, sloping sites at any incline, or may be hung vertically, instead of requiring the carefully levelled garden areas or greenhouses needed in hydroponics. After planting, it is only necessary to keep the film surfaces inside the planting envelopes damp in order for plants to grow. Irrigation is effected either by hand watering or by any standard watering installation.

For shipment and storage, each pliable planting envelope is crushed flat and packed in a corrugated boxboard carton of minimal weight and bulk. In accordance with one embodiment of the present invention, the waterproofed shipping carton may later be used as a platform to support the planted envelope during the growing season. For easy planting, the top walls of an envelope unfold and open out to allow insertion of seedling plants, then are closed by convenient bands or clamps to form a flexible seam through which the plant stems protrude. A vegetable garden using these planters may be readily installed and maintained anywhere: patios, decks, roof tops, balconies, sidewalk edges, etc. Planters may be replanted with successive crop plants during the season and are readily removed for subsequent storage or disposal, without damage to premises. Additional chemical packets may be added as required.

Cartons, planting envelopes and chemical packets can be fabricated by assembly line, mass production methods, using standard, inexpensive materials. Cost of a moist film prefabricated home garden should be no more than that of raising a comparable soil garden and substantially less than that of a hydroponic system.

The vertical and horizontal planters of the present invention are designed for patio and home gardening in restricted urban situations. However, there are many other applications for this basic plant culture system in both private and commercial operations. Dimensions and configuration of the planters may vary widely to suit various types of plants and crops for either food production or ornamental purposes. Planter design may be specially adapted for highly efficient crop production in large greenhouses as well as for outdoor gardening.

Because of its simplicity of operation, this growing method can be successfully used by almost anyone, regardless of prior training or experience. Requirements for labor, time, technical know-how and knowledge of soil chemistry are minimal.

BRIEF DESCRIPTION OF THE DRAWINGS

In the drawings forming part of this application:

FIG. 1 is a perspective view of one embodiment of the present invention.

FIG. 2 is a drawing, on a reduced scale, showing this embodiment of the invention in the "knock-down" form in which it would normally be shipped.

FIG. 3 is a partial view illustrating the internal structure of the envelope.

FIG. 4 is a partial view showing how the envelope folds over the plants.

FIG. 5 is a section on the line 5—5 of FIG. 1.

BRIEF DESCRIPTION OF THE DRAWINGS

Figure 6:
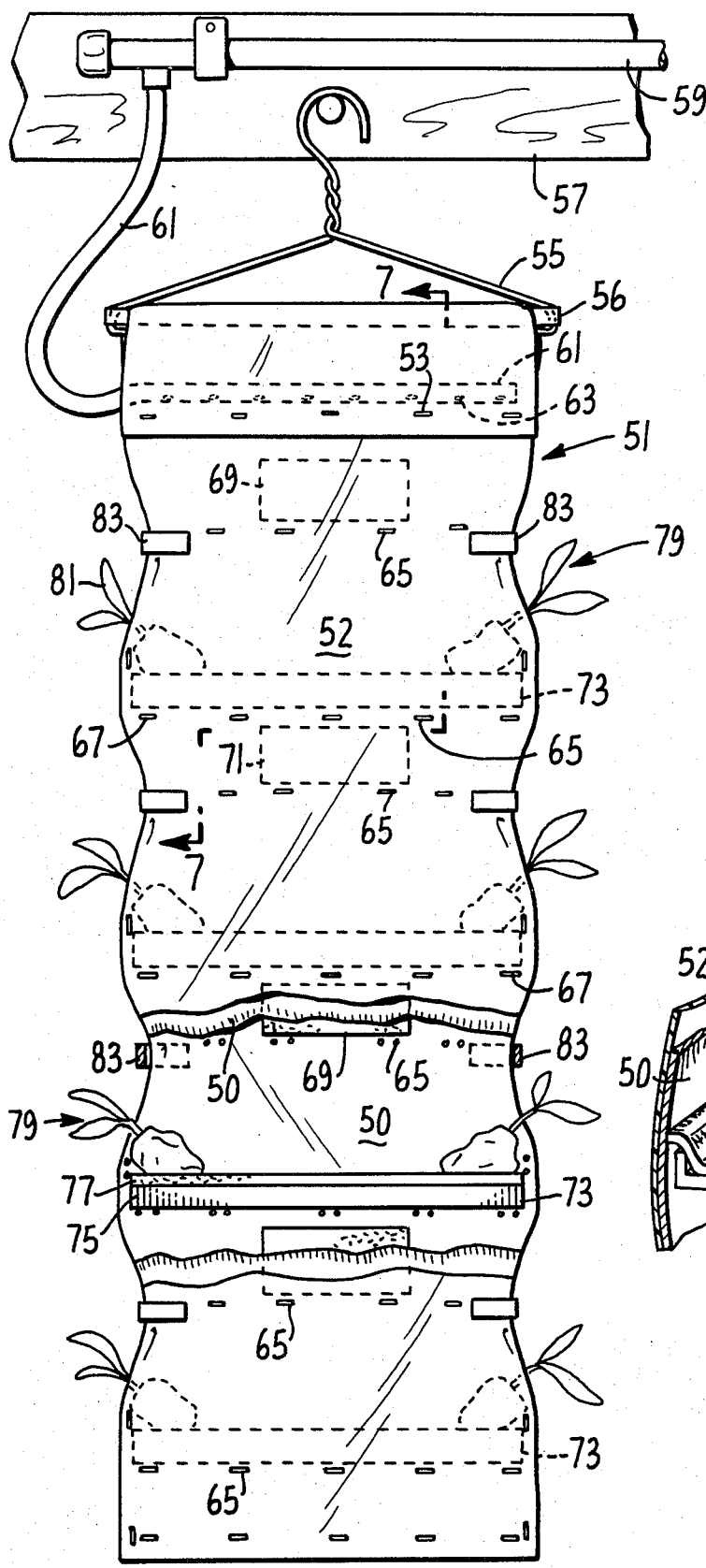
FIG. 6 is a side elevation of another embodiment of the invention.
Figure 7:
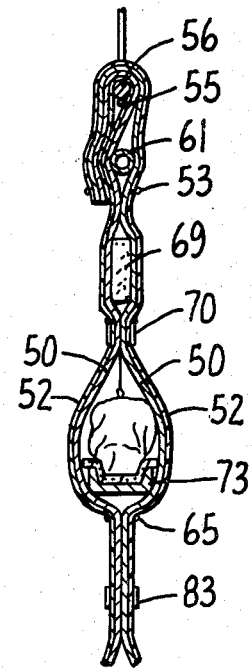
FIG. 7 is a section on the line 7—7 of FIG. 6.
Figure 8:
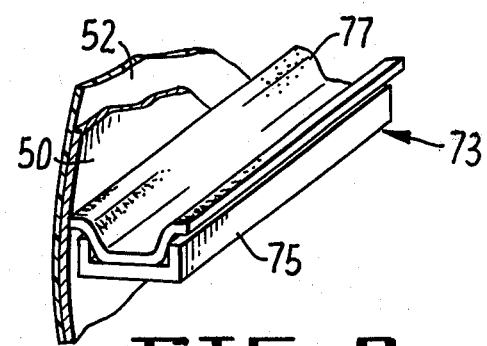
FIG. 8 is a perspective view of a shelf insert employed in the embodiment of FIG. 6.

Referring now to the drawings by reference characters, and particularly FIGS. 1-5 which describe a horizontal embodiment of the invention, the planter of the present invention has as its outer member a rectangular box 9 of a waterproof material such as a wax impregnated fiberboard, plastic, or the like. The box is compact, lightweight and easily transported to any site. The box is normally provided by a cover 11 which may be elevated to the position shown in phantom for the purpose of shading plants or, when growing mature plants, removed entirely. The box 9 and cover 11 form a closed structure so that the planter can, in effect, serve as its own shipping carton.

Under the box, two pallet sticks 13 and 15 are shown and these could be attached to the bottom of the box or, more commonly as is later explained, left loose within the box while it is in storage and shipment and then placed under the box when it is in use. The box is provided with draining holes 14. This is particularly valuable when one wishes to tilt the box to one side, as is shown in FIG. 5 wherein the pallet stick 13 is shown flat while pallet stick 15 is on edge to cause the box to tilt to one side, thus draining irrigation water to the edge to avoid flooding the roots.

Located within the box 9 is the envelope proper which is generally designated 17 and which consists of an outer sheet 19 of a flexible, opaque, waterproof material such as a plastic. The inner layer 21 comprises a flexible, moisture absorbent material of high capillarity such as burlap, Watermat, felt or the like. In order to stiffen the structure, interior ribs 23 are provided of a stiff, waterproof material such as plastic. It will thus be seen that the envelope 17 is flexible between the ribs so that plants can be placed between the ribs and the envelope closed along the edges 25 and 27 so that the envelope material will flex as at 29 allowing the stems 31 of plants to protrude without putting any substantial pressure on the stems of the plants. In the preferred embodiment of the invention, the flaps defined by the edges 25 and 27 are unequal so that a plant placed within the envelope will not be at the center but will be off to one side as is best seen in FIG. 5. Placing the pallet stick 15 on edge will cause the planter to tilt away from the short side so that any water 33 will not stand around the roots of the plants.

On the "high" side of the planter a chemical or nutrient packet 35 is provided. This can be in the form of a plurality of individual packets which are uniformly distributed along the high side of the planter or as an alternative, one packet can be provided for each plant. An additional packet 39 can be provided on the opposite flap where it will be in contact with the moisture absorbent material 21. Normally only one of the packets 35 or 39 would be used. If the planter is to be maintained in a horizontal position, as is later explained, one would use the packet 39 so that the dry chemical packet would not be in direct contact with the liquid water in the bottom of the planter. On the other hand, if the planter is tilted as is shown in FIG. 5, it is preferable to use packet 35. In either case, the nutrient packet consists of a complete, balanced homogenized mixture of dry chemical fertilizers which is sufficient to support the growth of plants and crops, preferably for a full growing season. Each packet has an outer covering of a water permeable material such as ordinary cloth. The mixture is initially dry but dissolves and disseminates across the moist surfaces of the inner layer 21 as fast as the roots can absorb nutrients. The dry nutrient chemicals can be those described in my prior patent although other mixtures could be used as is well know to those skilled in the art. In many instances, a burlap skirt 37 can be employed around the root ball 38 of the plant, the burlap serving to absorb moisture and provide additional root bearing surfaces in order to allow fast root propagation and plant development initially.

In the case of plants which require more moisture wherein a portion of the roots can actually stand in water, one would maintain the planter in a horizontal position as is shown in FIG. 1 and not employ the lower nutrient packet 35.

The seam formed when the edges 25 and 27 meet can be held together in a variety of ways. One would be to use clips or strings or adhesive tapes, linking the two meeting edges together. A preferred method is shown in FIG. 1 wherein the box member 9 has a plurality of slots 41 with mating cross member 43 bridging the top of the envelope containing the plants.

Both ends of the envelope 17 are folded over and held with staples, 45 and 47 leaving unstapled slits 48 and 49 at each end of the envelope to allow water to pass. One end, which is to the left in FIG. 1 protrudes horizontally through a small thin opening at the end of the box 9, which allows excess water to drain out of the envelope while preventing entry of bugs and the like. The opposite end of the envelope, similarly folded, is held in a vertical position as is shown at 48 by contact with the end of the box, allowing water to be introduced through the unstapled slit.

In many locales, space is at a premium in which case the vertical configuration shown in FIGS. 6–9 may be employed. This provides a moist filled plant culture system suitable for growing herbs, strawberries, vegtables, ornamentals and the like and gives much better utilization of space than the normal horizontal configuration. However, the principle of operation is exactly the same.

In this embodiment of the invention, a tube was made with an inner layer 50 of a water absorbent material such as that previously described. This is enclosed in one or more layers of opaque plastic 52 to form the composite tube 51. The top of the tube is folded over and stapled as at 53 and can be supported on a suitable hanger such as an ordinary coathanger 55 which preferably has been reinforced with a cross member 56 so that it can be hung on a beam or similar support 57. A standard drip irrigation header pipe 59 is provided leading to a source of water and a tube 61 leads into the top of the planter and extends across the top. The tube has a number of perforations 63 therein so that water can drip down through the planter. The planter has open seams at both sides and at spaced intervals, the tube is stapled together transversely as at 65 and 67 dividing the tube into a number of horizontal compartments. Of course, the staples which connect the two sides of the tube and form the compartments do not form water tight compartments so that liquid can trickle down through the tube along the inner moisture absorbent sheets. Thus water introduced to the top of the planter will flow down through all of the compartments of the planter and any excess will escape at the bottom.

Figure 9:
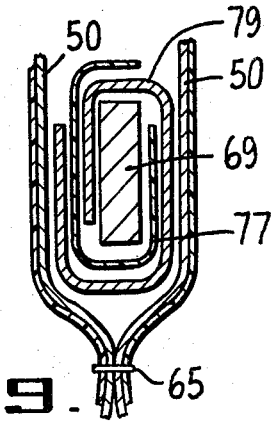
FIG. 9 is an enlarged partial section through one of the dry chemical packets.

In this embodiment of the invention, alternate pockets are employed for growing plants and for containing chemical packets. A method of holding the chemical packet within the planter is best seen in FIG. 9. Here the bottom of the compartment is defined by the staple 65 and the chemical packet 69 rests loosely within the compartment. Dry chemical packet 69 is partially surrounded by a water impervious film 77, the film being folded around the side and over the top of the packet so that as water flows down through the compartment it will not come into direct contact with the dry chemical packet. Folded within the plastic film is a sheet of water absorbent material 79 as previously described. As water flows down through the compartment, it will come in contact with the water absorbent material 79 and the leaching action will cause the water absorbent material to become saturated and thus dissolve a small portion of the dry chemical 69. This will be conveyed back to the absorbent wall 50 which forms an inner lining of the tube.

In alternate compartments shelves 73 are provided for holding plants. The structure of these shelves is best seen by reference to FIG. 8 wherein the shelf extends across the compartment leaving some space at the ends as can be seen in FIG. 6. Shelves 73 consist of a U-shaped water imprevious member 75 which supports a trough 77 of a water absorbent mat as has previously been described. Normally this water absorbent mat 77 would be of the same material as the inner lining of the wall and would be in contact with the inner lining of the wall 50 so that there is an interchange of moisture and chemicals. These shelves in alternate compartments support the actual growing plants.

The root balls of seedling plants such as 79 and 81 can be inserted through the side seams and the side seams partially closed around the stems of the protruding plants with clamps as is shown in 83. The planter is hung in a sunny place and periodically water is introduced through tubing 61. Plant support member 73 will then provide a small reservoir where part of the irrigation water trickling down the tube will accumulate, while excess will flow down to the next section and so on.

Figure 10:
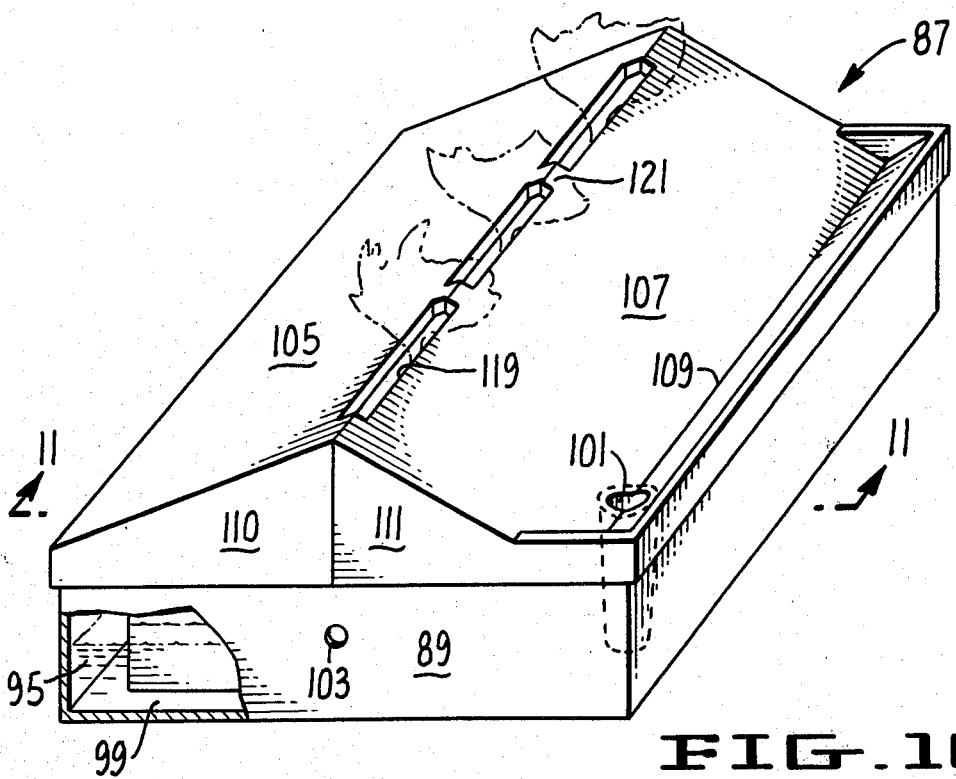
FIG. 10 is a perspective view of another embodiment of the invention.
Figure 11:
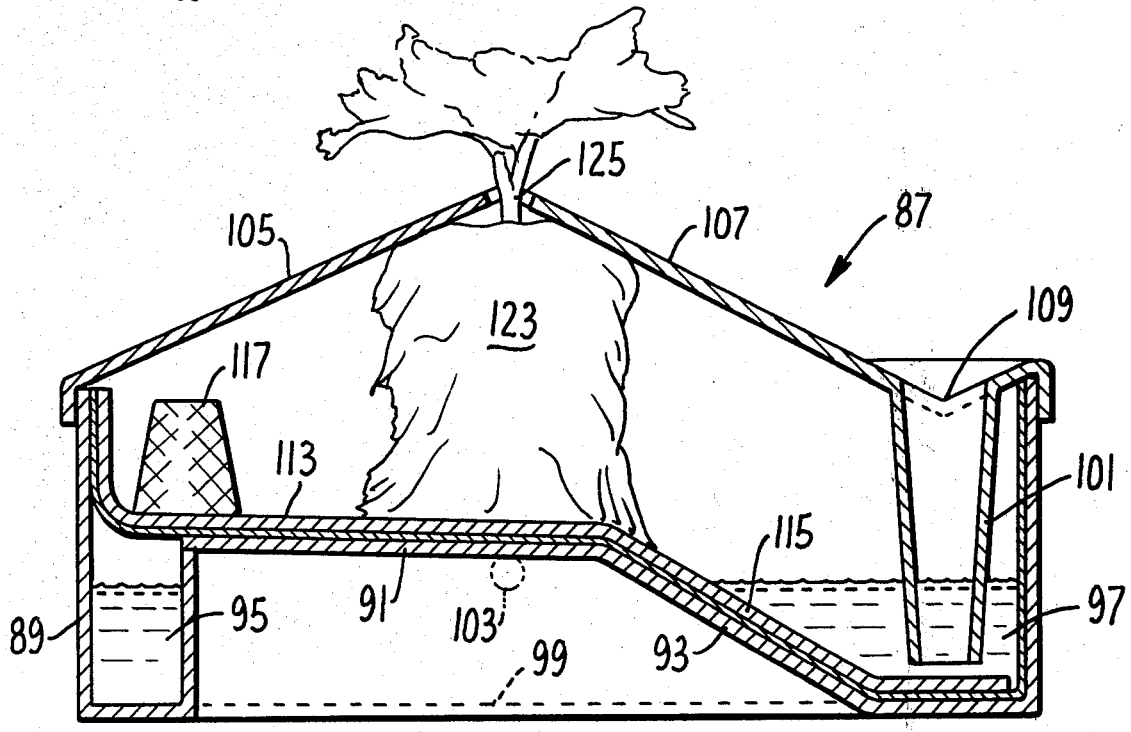
FIG. 11 is a section on the line 11—11 of FIG. 10.

In FIGS. 10 and 11 still another embodiment of the invention is shown wherein the outer walls of the planter are made of a rigid plastic although the principle of operation is exactly the same as previously described. In this embodiment of the invention, the planter designated 87 includes a lower box like member 89 with a sloping shelf formed therein. The sloping shelf has a generally horizontal portion 91 and a slanting section 93. The horizontal portion does not extend to the wall but instead a reservoir section 95 is formed at one side while at the opposite side a second reservoir section 97 is formed. A transverse reservoir channel 99 extends from one reservoir to the other to equalize the levels. Reservoir 97 has a filling opening 101 and a filter-covered overflow 103. Thus any fluid which is added to reservoir 97 will also flow into reservoir 95 and any excess will escape through the filter-covered opening 103.

A roof or top for the planter is formed from the two plastic sections 105 and 107 which fit over the base 89 more or less like a box. Each has end members, respectively 110 and 111. The top section 107 has a gutter like section 109 formed near one edge thereof so that if the device is placed out in the open, water from rain or sprinklers will flow down the top 107 be caught in the gutter 109 and flow into the opening of tube 101 to maintain the level of water at a desired point.

Disposed within the compartment thus formed and resting on the bottom portions 91 and 93 is a water absorbent mat 113 such as that previously described. One edge of the mat dips into the water reservoir as is shown at 115 while a dry chemical packet 117 rests on the mat above the water level. A plurality of dry chemical packets 117 would normally be employed disposed at intervals across the planter.

The top members 105 and 107 are notched as at 119 and the tabs 121 join edge to edge to hold the notches open.

When it is desired to use the device, the top is opened and the root ball 123 of a plant placed upon the mat 113 with the stem 125 extending out through one of the notches 119. The top portions are brought together and but the notches are held open by tabs 121. Preferably, a flexible, opaque seam closure of a material such as plastic film, not illustrated, can be employed to form a seal around the stems of the plants. Normally one strip would be used along each side of the notched openings. Since the edges are flexible, the closure strips meet and allow the plant stems to protrude up through the plastic strips substantially as was described in connection with FIG. 1. This helps to maintain a tight seam closure which excludes light from the roots and helps contain the highly humid air inside of the box. Thus, the operation of the device is exactly as previously described.

Although certain specific embodiments of the invention have been shown and described, it will be obvious to those skilled in the art that many variations can be made in the exact structure shown without departing from the spirit of this invention.

I claim:

1. A moist film plant culture system for growing plants comprising:

impermeable envelope having top and side wall means confining an air space in which roots of plants can grow, said envelope means having a seam along at least one edge thereof, support means for supporting the root ball of a plant within said air space, a first water absorbent matting material of high capillarity fastened within the envelope and a second water absorbent matting material of high capillarity surrounding the root ball, the surrounded root ball and expanding root system and the growing plant structure being supported on said first matting material within said air space, said envelope being two ply with one ply including a flexible moisture impermeable outer sheet and a second ply including said first matting material, said envelope further including a plurality of stiff cross ribs to maintain the walls and top means of the envelope in an elevated position to maintain said interior air space when the seam is closed, said flexible envelope being collapsible for shipping the culture system, a dry chemical nutrient packet, said packet being formed by a third water absorbent matting material enclosing a dry chemical nutrient, said nutrient pack being in contact with said first water absorbent material and spaced from the root ball, a nutrient transfer means for transferring nutrient from said packet to said plant structure, said transfer means including said matting materials, whereby when said water absorbent materials are wet, dissolved chemicals are leached from said nutrient packet and will migrate from the chemical packet to the root ball and to all root bearing surfaces, means for closing the seam of said envelope around the individual stems of a plurality of plants whereby the root balls and growing roots of said plants are surrounded by a confined pocket of highly humid air within said envelope and in contact with said water absorbent material and the leaves and stems of said plant protrude beyond said seams, and, a water reservoir spaced from said root ball and from said chemical packet and located to maintain water in contact with said first matting material and out of free water contact with the dry chemical packet.

2. The system of claim 1 wherein said envelope means comprises a horizontal envelope with a seam at the top.

3. The system of claim 2 wherein said envelope means is confined within an elongated box-like member.

4. The system of claim 3 having means to tilt said envelope means so that water within said envelope will flow to one side.

5. The system of claim 2 having supplemental moist sheets attached to each root ball within said envelopes said supplemental sheets forming extensions of the moisture absorbent envelope lining and providing additional root bearing surfaces for root propagation.

6. The system of claim 1 wherein said envelope means comprises a vertical envelope having slits at each side seam thereof and means for dividing the envelope into a plurality of horizontal compartments with chemical packets in alternate compartments and with plants inserted in alternate compartments with said chemical packets.

7. The system of claim 6 wherein the compartments which contain chemicals have a dry chemical partially surrounded by a water absorbent matting material with a water impervious material extending over the top of said dry packet whereby water dripping down through the envelope means will not come in direct contact with said dry chemical packet but whereby water will be conveyed by said water absorbent material to said packet.

8. The system of claim 6 wherein alternate compartments contain shelves which hold a reservoir of water at each level of the vertical envelope to insure uniform plant growth throughout the vertical height of the envelope.

* * * * *